United States Patent
Osawa et al.

(10) Patent No.: US 11,733,560 B2
(45) Date of Patent: Aug. 22, 2023

(54) DISPLAY DEVICE

(71) Applicant: Japan Display Inc., Tokyo (JP)

(72) Inventors: Shuichi Osawa, Tokyo (JP); Yoshikatsu Imazeki, Tokyo (JP); Yoichi Kamijo, Tokyo (JP); Koichi Miyasaka, Tokyo (JP); Yoshifumi Kamei, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/709,927

(22) Filed: Mar. 31, 2022

(65) Prior Publication Data

US 2022/0317512 A1 Oct. 6, 2022

(30) Foreign Application Priority Data

Mar. 31, 2021 (JP) ................................. 2021-060861

(51) Int. Cl.
*G02F 1/1335* (2006.01)

(52) U.S. Cl.
CPC .. *G02F 1/133514* (2013.01); *G02F 1/133528* (2013.01)

(58) Field of Classification Search
None
See application file for complete search history.

(56) References Cited

U.S. PATENT DOCUMENTS

| | | | | |
|---|---|---|---|---|
| 6,250,765 | B1* | 6/2001 | Murakami | G02B 5/02 359/601 |
| 2005/0062928 | A1* | 3/2005 | Yau | H04N 23/84 349/201 |
| 2010/0182540 | A1* | 7/2010 | Mifune | G02B 6/005 349/65 |
| 2014/0368782 | A1* | 12/2014 | Kim | G02F 1/1341 349/153 |
| 2017/0363803 | A1* | 12/2017 | Nakamori | G02F 1/134309 |
| 2018/0252964 | A1* | 9/2018 | Nakaoka | G02F 1/133528 |
| 2019/0113796 | A1* | 4/2019 | Jin | G02B 6/0053 |

FOREIGN PATENT DOCUMENTS

| | | |
|---|---|---|
| JP | 2018-146750 A | 9/2018 |
| JP | 2020-158358 A | 10/2020 |

* cited by examiner

*Primary Examiner* — Shan Liu

(74) *Attorney, Agent, or Firm* — K&L Gates LLP

(57) ABSTRACT

According to one embodiment, a display device includes a backlight source, liquid crystal panel, and color separating element substrate. The liquid crystal panel includes an adherence area with a predetermined width in a peripheral part of the transparent material substrate in the incident surface side of the backlight, and the color separating element substrate includes a step with a predetermined height, in the peripheral part of the surface opposed to the liquid crystal panel, and an upper surface of the step of the color separating element substrate and the adherence area of the transparent material substrate of the liquid crystal panel are adhered through a film therebetween.

3 Claims, 9 Drawing Sheets

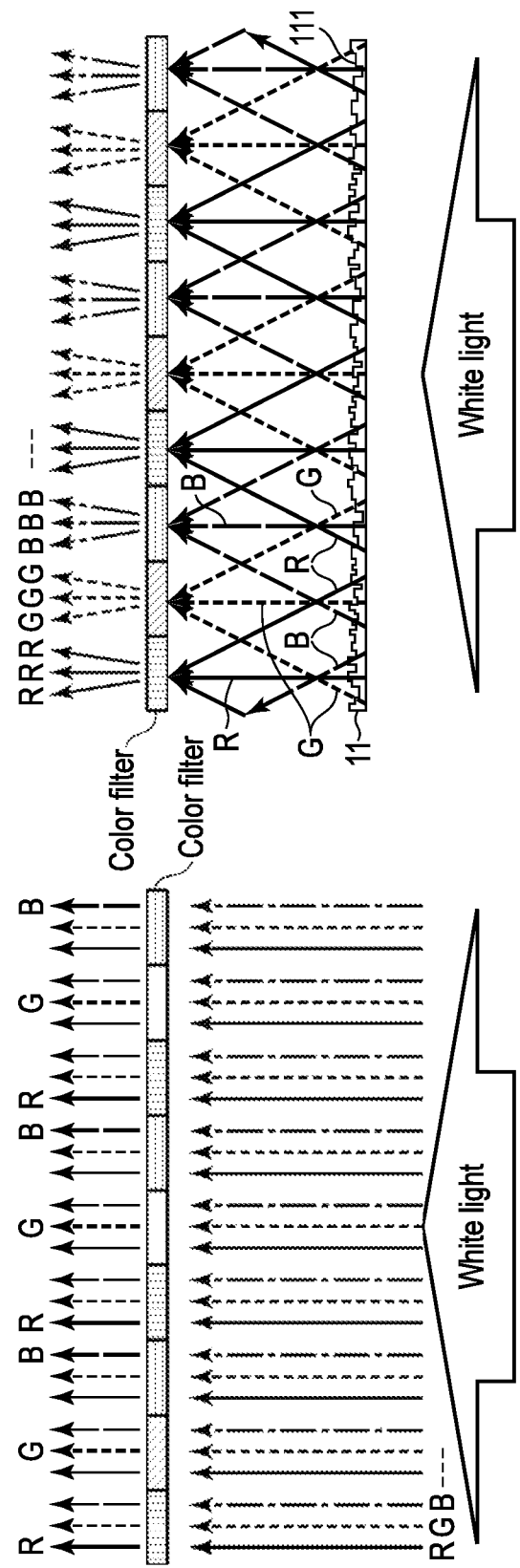

DISPLAY DEVICE

CROSS-REFERENCE TO RELATED APPLICATIONS

This application is based upon and claims the benefit of priority from Japanese Patent Application No. 2021-060861, filed Mar. 31, 2021, the entire contents of which are incorporated herein by reference.

FIELD

Embodiments described herein relate generally to a display device using a color separating element technique.

BACKGROUND

Color filter (CF) type display devices used in liquid crystal display modules are to emit which backlight to a liquid crystal panel in which RGB color filters (CFs) are formed per pixel (panel in which a CF substrate is layered on a liquid crystal thin-film-transistor (TFT) substrate) such that the which backlight is incident on each filter of the RGB pixels according to displayed images, and thereby, light of CF color wavelength is passed while the light of wavelength other than CF is absorbed. Thus, use efficiency of the light is low. In order to increase the use efficiency of the light, the light separating element technique has been proposed.

In the color separating element technique, using a color separating element in which color separating grooves with asperity of predetermined pattern are formed on a surface of a glass substrate, the white backlight is incident, and RGB wavelength components are diffracted in specific directions to be separated from each other. In the present technique, in a CF type display device, a glass substrate with the color separating element (hereinafter, color separating element substrate) is disposed between a backlight source and the liquid crystal panel, and the color separating element separates the backlight into wavelengths corresponding to RGB CFs, and diffracts into predetermined directions, and only the light of wavelengths corresponding to CFs is incident on each of RGB pixel filters on the liquid crystal panel. Thus, the absorbent of the light of wavelength other than the wavelengths corresponding to the CFs will be reduced, and the use efficiency of light (brightness) will be improved.

Note that, a gap (air gap) to spatially separate the light rays diffracted color-by-color is required between the color separating element and the liquid crystal panel. Thus, there is a proposed method of forming such a gap by adhering the bezel of the liquid crystal panel and the peripheral part of the color separating element substrate using a double-sided tape in a substantially squared-ring shape, thereby defining a gap by the thickness of the double-sided tape.

However, when the double-sided tape is used for adherence, multiple adhering trials are required because of varying thicknesses of the tape itself, and necessity of adhering the double-sided tape with both the liquid crystal panel and the color separating element substrate, which may result a risk of misalignment.

BRIEF DESCRIPTION OF THE DRAWINGS

FIGS. 9A and 9B are cross-sectional views each illustrating a specific process example of the color separating element of FIG. 8.

DETAILED DESCRIPTION

Figure 1:
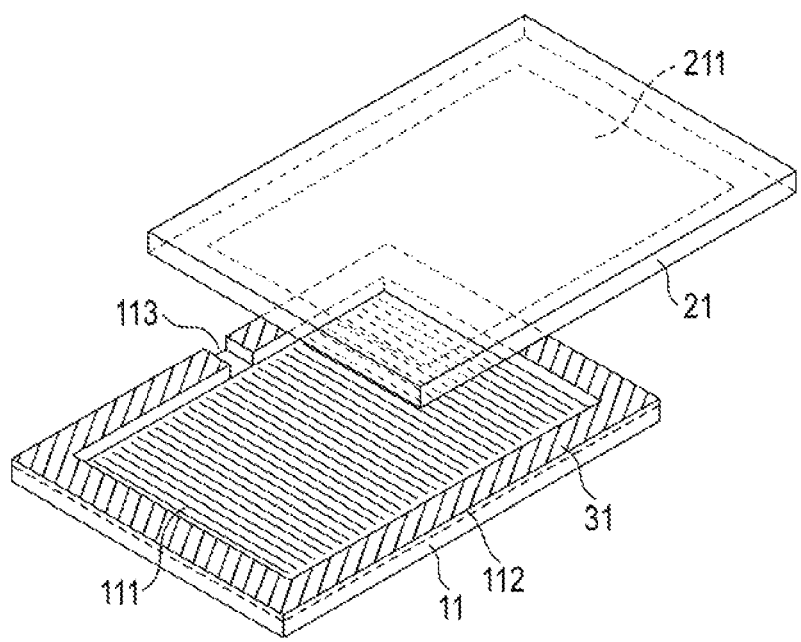
FIG. 1 is a perspective of illustrating a basic structure of a display device of a first embodiment in a disassembled manner.

In general, according to one embodiment, a display device includes a backlight source, liquid crystal panel, and color separating element substrate. The liquid crystal panel receives backlight from the backlight source and absorbs designated color components by color filters according to displayed images. The color separating element substrate is disposed between the liquid crystal panel and the backlight source, and a color separating element is formed on one surface of the transparent material substrate. The liquid crystal panel incudes an adherence area with a predetermined width in a peripheral part of the transparent material substrate in the incident surface side of the backlight, and the color separating element substrate includes a step with a predetermined height, in the peripheral part of the surface opposed to the liquid crystal panel, and an upper surface of the step of the color separating element substrate and the adherence area of the transparent material substrate of the liquid crystal panel are adhered through a film therebetween.

According to the above structure, the color separating element substrate and the liquid crystal panel can be integrated with an uniformed gaps without shifting.

Various embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, for those elements the same as or similar to each other, which are arranged sequentially, reference symbols may be omitted. Further, the elements the same as those described in connection with preceding drawings or those exhibiting similar functions are denoted by like reference numerals, and a detailed description thereof is omitted unless otherwise necessary.

First, a color separating element applied to the present embodiment will be explained with reference to FIGS. 8, 9A, and 9B.

Figure 8:
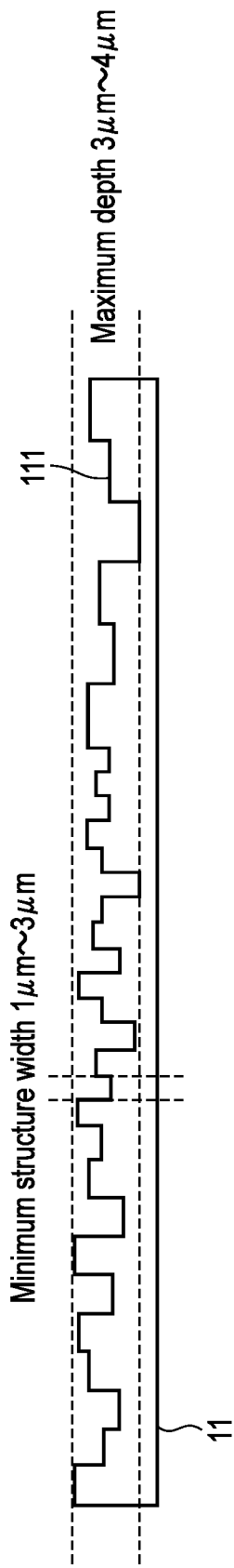
FIG. 8 is a cross-sectional view illustrating a specific structure of a color separating element applied to the embodiments.

FIG. 8 is a cross-sectional view of a specific structure of the color separating element, and FIGS. 9A and 9B are cross-sectional views illustrating a color separation example of the backlight of the color separating element of FIG. 8.

That is, the color separating element is, as in FIG. 8, a glass substrate with grooves formed with a minimum structural width of 1 to 3 µm and a maximum depth of 3 to 4 µm in a predetermined pattern corresponding to RGB. Hereinafter, the aforementioned groove will be referred to as color separating groove 111. Furthermore, the glass substrate on which the color separation groove 111 is formed will be referred to as color separating element substrate 11.

When backlight (white light) enters the color filter as is, the R, G, and B filters absorb light other than R, G, and B, respectively, as in FIG. 9A. In contrast, when backlight (white light) enters the color filter via the color separating element substrate 11, as in FIG. 9B, the R, G, and B light rays are diffracted in in different directions, and focused on the filter of each color. This reduces light absorption in the color filter, thereby improving the use efficiency of light (brightness).

Hereinafter, an embodiment of a display device using the above color separating element substrate 11 will be explained.

FIG. 1 is a perspective view of the basic structure of a display device of the first embodiment, illustrated in a disassembled manner. The display device of FIG. 1 includes a color separating element substrate 11 on which color separation grooves 111 are formed, a liquid crystal panel 21 in which a CF substrate and a liquid crystal TFT substrate are laminated, and an inorganic transparent film 31 formed of a glass material of approximately 10 nm used to adhere the substrate 11 and the panel 21 together.

The color separating element substrate 11 includes a perimeter wall 112 with a predetermined height that forms a step structure in the peripheral part. Note that a part of the peripheral wall is cut out as an air hole 113. The air hole 113 functions as a measure to prevent condensation in the inner space.

On the other hand, in the liquid crystal panel 21, an adherence area with a predetermined width is secured from the peripheral edge on the backlight incident surface side. A lower polarizer 211 is mounted inside the adherence area.

A transparent inorganic film (an inorganic thin film formed of a transparent material) 31 is adhered to the upper surface of the outer wall 112 of the color separating element substrate 11 above, and on top of that, the adherence area of the liquid crystal panel 21 is aligned and attached. The details of bonding glass substrates using transparent inorganic film are explained on the website of RUN Technical Service Corporation (http://www.lantechnical.co.jp). Adherence and bonding of the transparent inorganic film 31 is performed by depositing the film on the material surface by ion beam sputtering in a vacuum environment.

As a result, the color separating element and the liquid crystal panel are opposed to each other at a certain distance, and the color separating element substrate 11 separates the light incident from the bottom side of the color separating element substrate 11 into RGB colors to be illuminated onto the color filters of the liquid crystal panel 21. At this time, the color separating element substrate 11 and the liquid crystal panel 21 are adhered together via the transparent inorganic film 31, and thus, they can be integrated with uniform thickness and without any misalignment.

Figure 2:
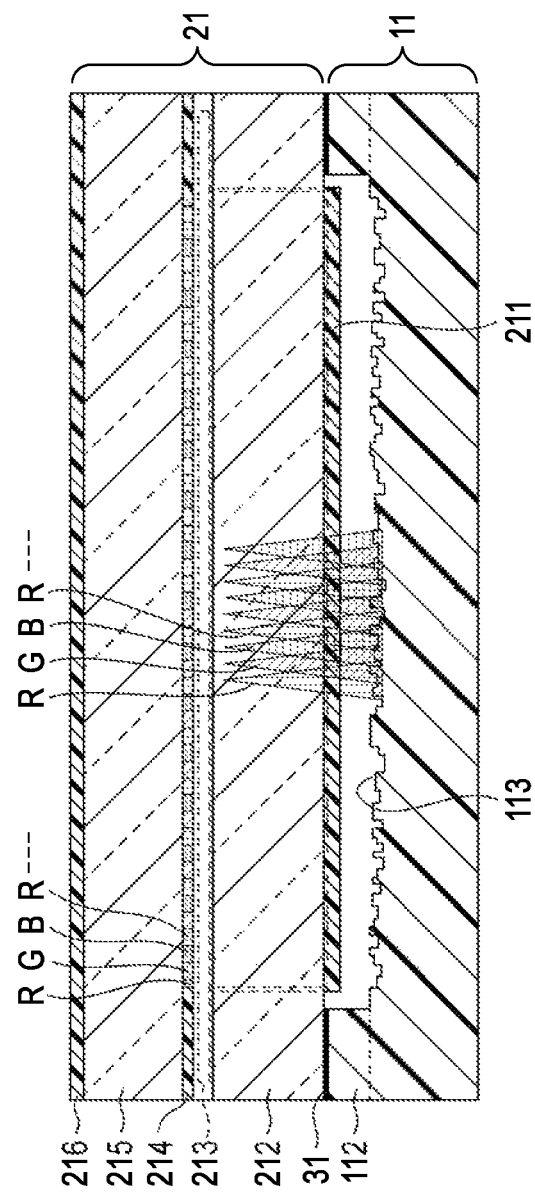
FIG. 2 is a cross-sectional view illustrating a specific structure of the display device of the second embodiment.

FIG. 2 is a cross-sectional view illustrating the specific structure of the display device of the first embodiment, and FIGS. 3A to 3E illustrate a step-by-step manufacturing process of the display device of the first embodiment.

As in FIG. 2, the display device of the present embodiment has a layered structure in which the color separating element substrate 11 and the liquid crystal panel 21 are adhered together through the transparent inorganic film 31. First, the color separating element substrate 11 includes the perimeter wall 112 with a predetermined height, except for the air hole 113, and the color separation groove 111 is formed on the inner upper surface thereof. On the other hand, the liquid crystal panel 21 includes a lower polarizer 211, TFT glass substrate 212, liquid crystal TFT substrate 213, CF substrate 214, CF glass substrate 215, upper polarizer 216 layered in this order from the backlight incident side.

Figure 3C:
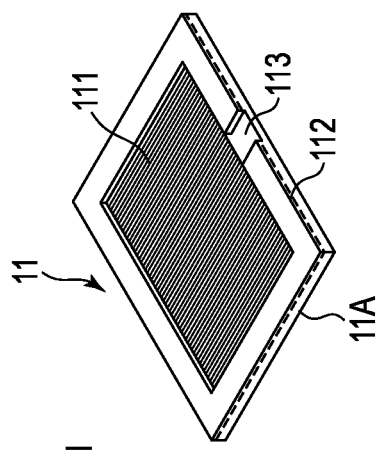
FIGS. 3A to 3E are diagrams illustrating a manufacturing process of the display device of the first embodiment step-by-step.
Figure 3E:
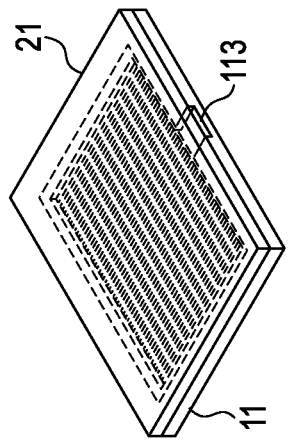
Figure 3B:
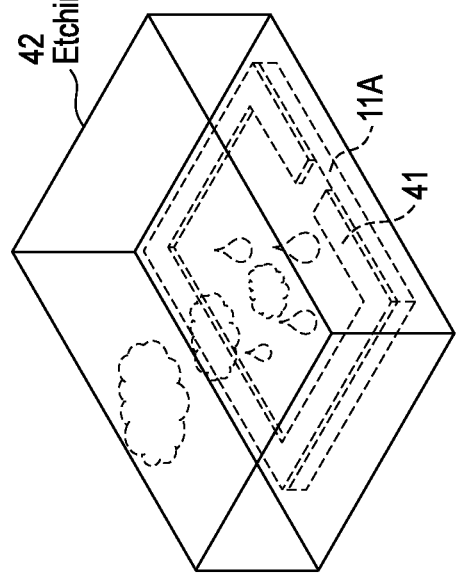
Figure 3D:
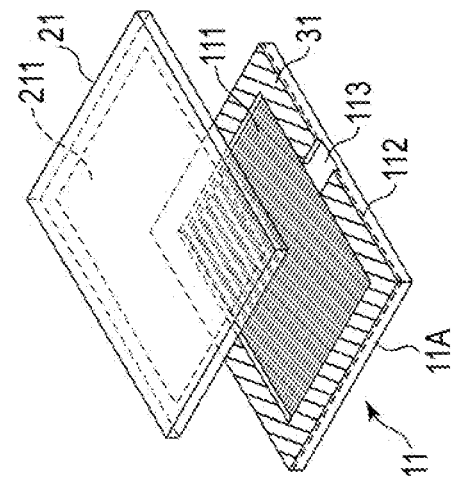
Figure 3A:
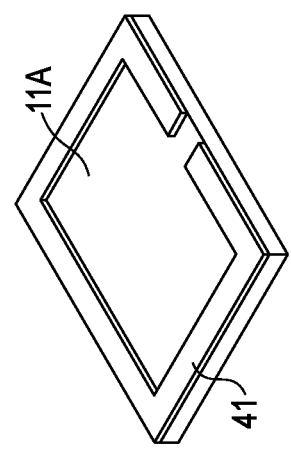

The above color separating element substrate 11 is subjected to a pretreatment of FIG. 3A in the manufacturing process. In this process, the upper surface of the glass substrate 11A, which is used as a material for the color separating element substrate 11, is coated with hydrogen fluoride (HF) resistant material in a certain width along the periphery, except for the part used for the air hole 113.

Next, as in FIG. 3B, the pretreated glass substrate 11A is placed in a etching vessel 42 and is etched for a certain period of time. As a result, the part of the glass substrate 11A to which HF resist 41 has been applied remains, and the other part is dissolved to a depth equivalent to the etching time. As a result, as in FIG. 3C, the glass substrate 11A is shaped with the perimeter wall 112 with a constant thickness on the upper surface peripheral part, except for the air hole 113 part. Here, color separating grooves 111, which serve as color separating elements, are formed by nanoprinting in the area surrounded by the peripheral wall 112 of the glass substrate 11A. This completes the formation of the color separating element substrate 11. In this state, as in FIG. 3D, a transparent inorganic film 31 is applied to the upper surface of the perimeter wall 112 of the above color separating element substrate 11, and on top of that, as in FIG. 3E, the liquid crystal panel 21 is adhered by aligning the adherence area.

Through the above manufacturing process, the color separating element substrate 11 and the liquid crystal panel 21 can be integrated with a uniform gap and without any misalignment.

Figure 4:
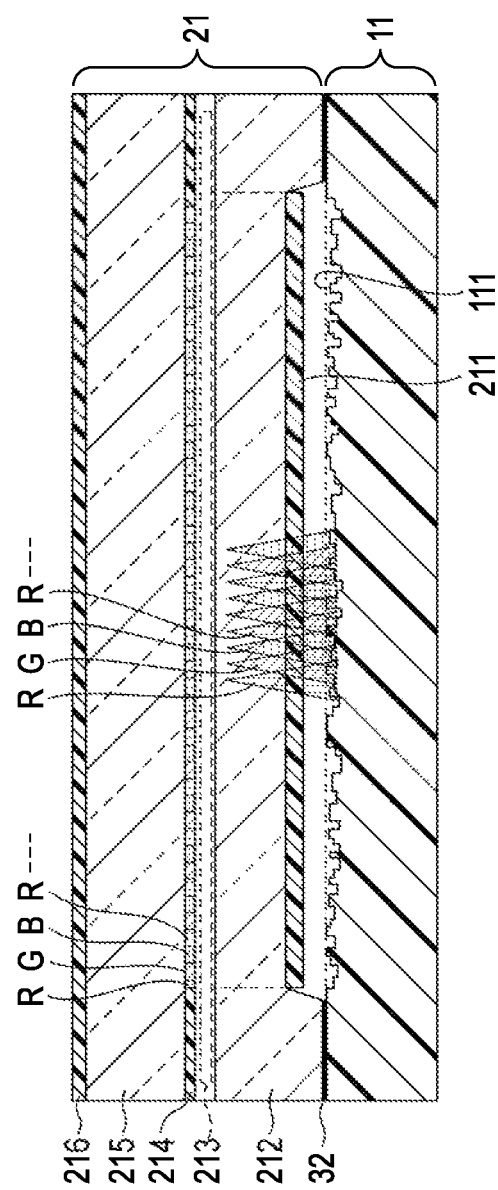
FIG. 4 is a cross-sectional view illustrating a specific structure of a display device of a second embodiment.

FIG. 4 is a cross-sectional view illustrating the specific structure of a display device of a second embodiment, and FIGS. 5A to 5D illustrate a step-by-step manufacturing process of the display device of the second embodiment.

In the first embodiment, the step structure is formed in the color separating element substrate 11, but in the present embodiment, the step structure is formed in the liquid crystal panel 21. That is, as in FIG. 4, the display device of the present embodiment includes a color separating element substrate 11 and a liquid crystal panel 21 structured basically the same as those of the first embodiment while, in this embodiment, the color separating element substrate 11 has no steps in the periphery part, but a constant-width adherence area, and color separating grooves 111 that serve as the color separating element are formed inside the adherence area by nanoprinting. On the other hand, in the liquid crystal panel. 21, except for an air hole 113, a perimeter wall. 2121 with a predetermined height is formed to form a step structure in the peripheral part of a TFT glass substrate 212, and a lower polarizer 211 is placed inside thereof.

Figure 5:
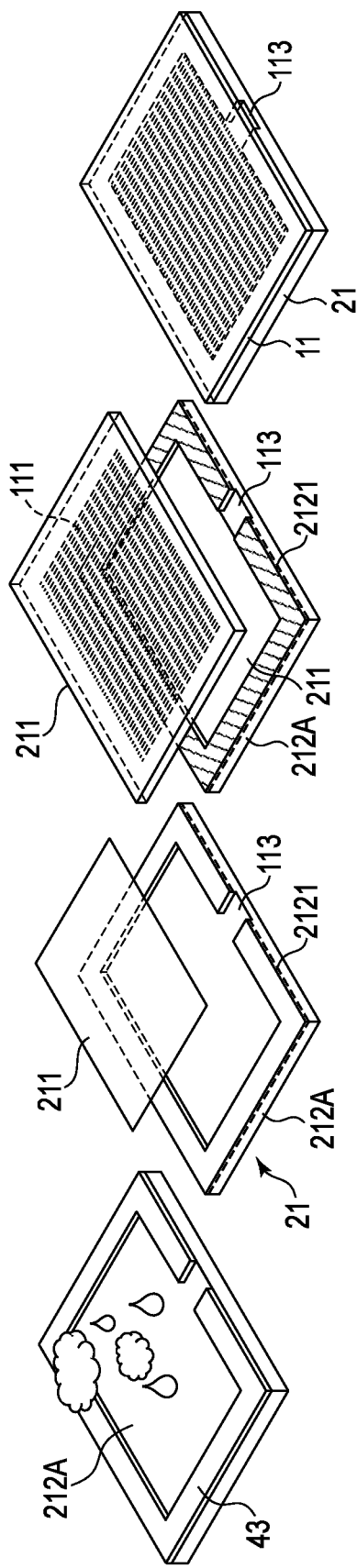
FIGS. 5A to 5D are diagrams illustrating a manufacturing process of the display device of the second embodiment step-by-step.

The above TFT glass substrate 212 is subjected to a pretreatment shown in FIG. 5A in the manufacturing process thereof. In this process, a hydrofluoric acid (HF) resist 43 is applied to the upper surface of the glass substrate 212A, which is the source of the TFT glass substrate 212, with a certain width along the periphery except for the formation part of the air hole 113. The glass substrate 212A is then placed in an etching container (not shown), and etched for a certain period of time. As shown in FIG. 5B, the part of the glass substrate 212A to which the HF resist is applied remains, and the other parts are dissolved to a depth corresponding to the etching process time. As a result, the glass substrate 212A is shaped to have a perimeter wall 2121 with a constant height, except for the part where the air hole 113 is formed. The lower polarizer 211 is placed in the area surrounded by the perimeter wall 2121. In this state, as shown in FIG. 5C, a transparent inorganic film 32 is applied to the top surface of the perimeter wall 2121 of the above TFT glass substrate 11, and then, on top of that, the color separating element substrate 11 is adhered as in FIG. 5D by aligning the adherence area.

Through the above manufacturing process, the color separating element substrate 11 and the liquid crystal panel 21 can be integrated with a uniform gap and without any misalignment.

Figure 6:
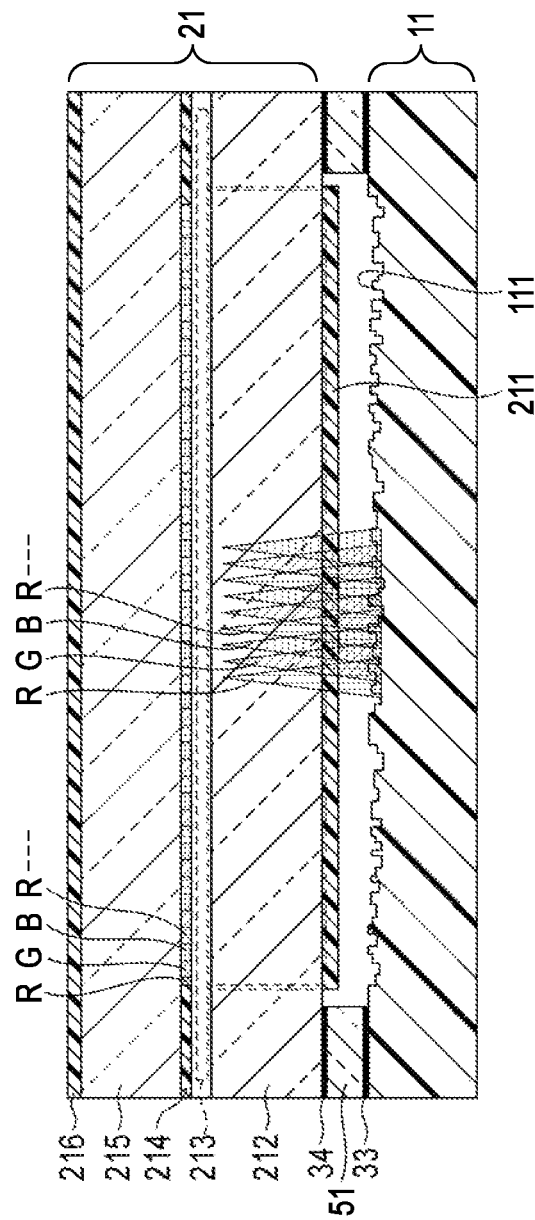
FIG. 6 is a cross-sectional view illustrating a specific structure of a display device of a third embodiment.
Figure 7A:
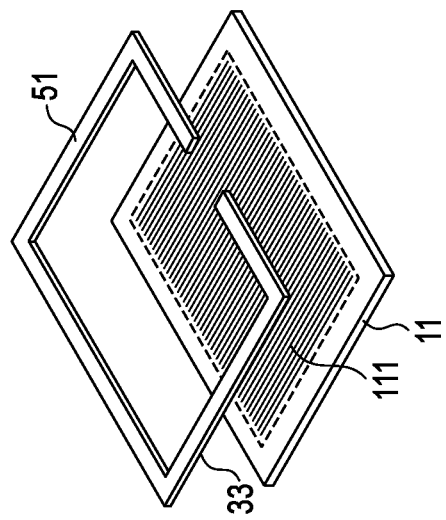
FIGS. 7A to 7C are diagrams illustrating a manufacturing process of the display device of the third embodiment step-by-step.
Figure 7B:
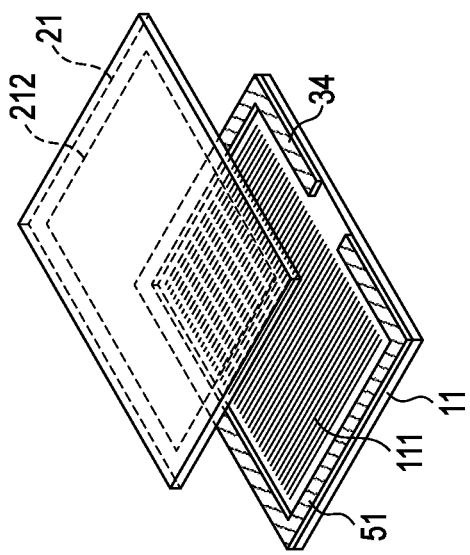
Figure 7C:
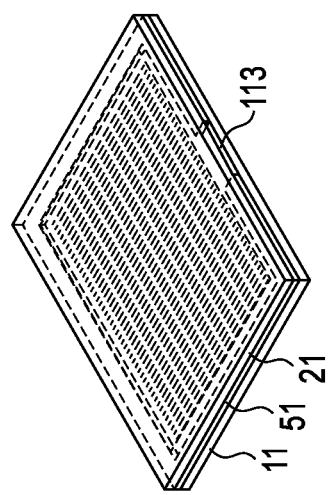

FIG. 6 is a cross-sectional view illustrating the specific structure of a display device of a third embodiment, and FIGS. 7A to 7C illustrate a step-by-step manufacturing process of the display device of the third embodiment.

In the first embodiment, the step structure is formed in the color molecular element substrate 11, and in the second embodiment, the step structure is formed in the TFT glass substrate 212 of the liquid crystal panel 21. In the present embodiment, however, the step structure is formed of other glass member. That is, the display device of the present embodiment includes a color separating element substrate 11, and a liquid crystal panel 21 structured basically the same as those of the first and second embodiments while, in the present embodiment, the color separating element substrate 11 and the TET glass substrate 212 of the liquid crystal panel 21 have no steps in the peripheral part, and have an adherence area with a predetermined width. Between the color separating element substrate 11 and the TFT glass substrate 212 of liquid crystal panel. 21, a differently-shaped glass frame 51 formed with a predetermined height is bonded along the each peripheral part, except for the part where air holes 113 are formed through transparent inorganic films 33 and 34.

In the manufacturing process of the display device with the above structure, first, as in FIG. 7A, the adherence area with a predetermined width is disposed on the upper surface periphery of the color separating element substrate 11, and the differently-shaped glass frame 51 formed along the adherence area with the transparent inorganic film 33 adhered to the opposing surface is adhered thereto by aligning the adherence area from above. Then, as in FIG. 7F, the transparent inorganic film 34 is attached to the upper surface of the glass frame 51, and on top of that, the TFT glass substrate 212 of the liquid crystal panel 21 is adhered by aligning the adherence area, as in FIG. 7C.

Through the above manufacturing process, the color separating element substrate 11 and the liquid crystal panel 21 can be integrated with a uniform gap and without any misalignment while avoiding forming a step therein. In the present embodiment, since an alternate member is used for adherence, and the number of adhering increases; however, using transparent inorganic films can sufficiently decrease a risk of misalignment as compared to a case where a double-sided tape is used.

Note that, in the above-described embodiments, the color separating element substrate, liquid crystal TFT substrate, and transparent inorganic film are formed of glass materials; however, a transparent material such as resin may be used instead. The transparent thin film for adherence is not limited to be inorganic, and may be organic.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a backlight source configured to emit backlight;
   a liquid crystal panel on which the backlight is incident; and
   a color separating element substrate disposed between the liquid crystal panel and the backlight source, including a color separating element on one surface of a transparent material substrate of the liquid crystal panel, wherein
   the liquid crystal panel includes a step with a predetermined height in a peripheral part of the transparent material substrate of the liquid crystal panel opposed to the color separating element substrate,
   the color separating element substrate includes an adherence area with a predetermined width in the peripheral part of the surface opposed to the liquid crystal panel,
   an upper surface of the step of the transparent material substrate of the liquid crystal panel and the adherence area of the color separating element substrate are adhered through a film therebetween, and
   an opening is partly formed in the step as an air hole.

2. The display device according to claim 1, wherein the liquid crystal panel includes a polarizer inside the step, and
   the color separating element substrate includes a color separating element inside the adherence area.

3. The display device according to claim 1, wherein the film is a transparent inorganic film.

* * * * *